(No Model.)

H. SCHWALBE & H. G. SCHNEIDER.
NUT LOCK.

No. 523,549. Patented July 24, 1894.

Witnesses
L. Dowelle,
A. P. Jennings.

Inventors
Henry Schwalbe
Henry G. Schneider
By their Attorney
John Biedersheim

UNITED STATES PATENT OFFICE.

HENRY SCHWALBE AND HENRY G. SCHNEIDER, OF PHILADELPHIA, PENNSYLVANIA, ASSIGNORS OF ONE-FOURTH TO THOMAS DONNELL, OF SAME PLACE.

NUT-LOCK.

SPECIFICATION forming part of Letters Patent No. 523,549, dated July 24, 1894.

Application filed March 7, 1894. Serial No. 502,687. (No model.)

*To all whom it may concern:*

Be it known that we, HENRY SCHWALBE, a subject of the King of Saxony, and HENRY G. SCHNEIDER, a citizen of the United States, both residing in the city and county of Philadelphia, State of Pennsylvania, have invented a new and useful Improvement in Nut Locks or Fasteners, which improvement is fully set forth in the following specification and accompanying drawings.

Our invention consists of a nut which is provided with a tongue, projecting into the bore or opening thereof, and adapted to enter a groove in the bolt to be locked or fastened, said tongue being connected with an interior spring which is engaged by an arm which is connected with another spring, the latter being outside of the nut so as to be pressed, whereby the tongue may be disengaged from the bolt, thus permitting the nut to be screwed in the bolt, and when the spring is let go, the bolt is engaged by the tongue and accordingly locked or fastened.

Figure 1:
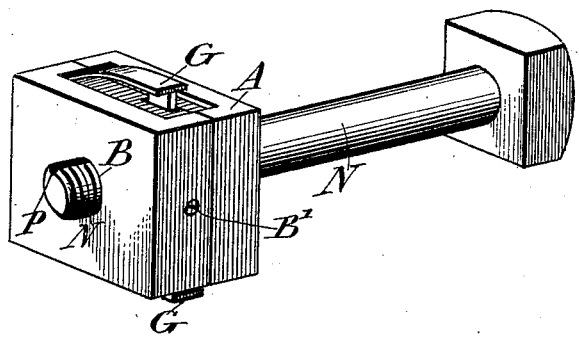
Figure 2:
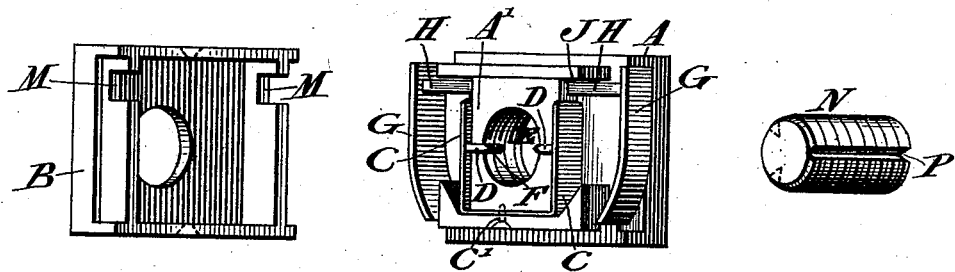
Figure 3:
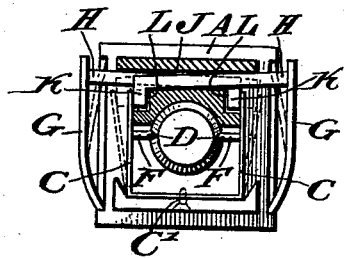

Figure 1 represents a perspective view of a nut lock or fastener embodying our invention. Fig. 2 represents perspective views of parts thereof in separated condition. Fig. 3 represents a face view showing the operation of the lock or fastener.

Similar letters of reference indicate corresponding parts in the several figures.

Referring to the drawings: A designates a nut which has a cap B secured thereto by screws B', which pass through the side wall of said cap, and enter the off-set A' of the nut. On the sides of said off-set are springs C, with which are connected the tongues D, the latter passing through a recess in the wall of said off-set, and projecting into the threaded opening E of the nut, as at F, said recess communicating with said threaded opening. On the exterior of the nut and cap are springs G, to which are attached the arms H, the latter passing freely in opposite directions through a slot J in the nut, and having their inner ends K of angular or bent form bearing against the springs C, the outward motions of said arms being limited by shoulders L on the side of the off-set A'. In the side walls of the cap B are recesses M, for the play of the portions of the arms H, adjacent to the springs G.

N designates the bolt which has in its side the longitudinally-extending groove P, which is adapted to receive either of the tongues D of the nut.

The operation is as follows: The springs G are pressed inwardly, whereby the tongues D are forced outwardly, and consequently withdrawn from the bore or opening of the nut. The nut may now be screwed to the bolt, or vice-versa, and when the desired place is about reached, the springs are let go, and the tongues return to their normal position, when the tongue that registers with the groove P enters the same, the rotation of the bolt then being stopped, and the bolt is locked or fastened. When the springs G are again pressed-in, the nut may be unscrewed or screwed up to a greater extent as required.

The ends of the tongues are serrated so as to conform to the threads of the bolt, and permit the ready rotation of the latter prior to the entrance of the tongue into the locking groove without injury to said threads.

The cap covers the off-set, and the parts fitted thereto when removed, and permits access to said parts.

The spring C may be formed of a piece of bent material the bent portion being secured in a recess of the off-set A' by means of the screws C'.

Having thus described our invention, what we claim as new, and desire to secure by Letters Patent, is—

1. A nut having a tongue projecting into the threaded opening thereof, a spring connected with said tongue, an arm engaging with said spring, and an exterior spring attached to said arm, the parts being combined substantially as described.

2. A nut formed with an off-set, a recess in said off-set communicating with the threaded opening of the nut, and a shoulder on the side of said off-set, in combination with a tongue which occupies said recess and enters said opening, a spring connected with said tongue, an arm bearing against said spring, and an exterior spring connected with said arm, substantially as described.

3. A nut having a tongue projecting into the threaded opening thereof, a spring connected with said tongue, an arm working in a slot in said nut and bearing against said spring, a spring connected with said arm, and a cap covering the spring connected with said arm, said parts being combined substantially as described.

4. A nut having an offset with a recess therein, a tongue in said recess, a spring bearing against said tongue, an arm working in a slot in said nut, bearing against said spring and having an angular limb adapted to engage with a shoulder on said offset, and a spring connected with said arm, said parts being combined substantially as described.

HENRY SCHWALBE.
HENRY G. SCHNEIDER.

Witnesses:
JOHN A. WIEDERSHEIM,
R. H. GRAESER.